United States Patent [19]

Del Serra

[11] Patent Number: 4,513,215
[45] Date of Patent: Apr. 23, 1985

[54] ANTI-ROTATION MOTOR BEARING

[75] Inventor: David I. Del Serra, Claremore, Okla.

[73] Assignee: Hughes Tool Company, Houston, Tex.

[21] Appl. No.: 538,646

[22] Filed: Oct. 3, 1983

[51] Int. Cl.³ .............................................. H02K 5/00
[52] U.S. Cl. ...................................... 310/90; 310/87; 310/91; 29/598; 384/428
[58] Field of Search ............... 310/87, 90, 157, 42, 310/43, 45, 114, 91; 277/1; 29/596, 598; 384/428; 525/270, 237

[56] References Cited

U.S. PATENT DOCUMENTS

| | | | |
|---|---|---|---|
| 3,136,905 | 6/1964 | Zapf et al. | 310/87 |
| 3,362,765 | 1/1968 | Pierce | 384/125 |
| 3,551,714 | 12/1970 | Boyd | 310/87 |
| 3,926,900 | 12/1975 | Guzy | 525/237 |
| 3,930,691 | 1/1976 | Greene | 384/224 |
| 4,119,874 | 10/1978 | Beavers et al. | 310/90 |
| 4,268,094 | 5/1981 | Greene | 309/9 |
| 4,277,115 | 7/1981 | Stuwe et al. | 308/26 |
| 4,435,661 | 3/1984 | Witten | 310/90 |

*Primary Examiner*—R. Skudy
*Attorney, Agent, or Firm*—Robert A. Felsman; James E. Bradley

[57] ABSTRACT

A submersible pump motor has a bearing that resists rotation with the rotor shaft. The motor has a stator within which a rotor is rotated. The rotor has spaced-apart rotor sections mounted on a shaft. The bearing is stationary and has a cavity in its outer periphery. An elastomeric element is contained in the cavity. The element is of a material that swells upon operation of the motor for frictionally engaging the stator to prevent rotation of the bearing.

5 Claims, 2 Drawing Figures

ANTI-ROTATION MOTOR BEARING

BACKGROUND OF THE INVENTION

1. Field of the Invention

This invention relates in general to submersible pump motors, and in particular to a bearing which resists rotation. The bearing supports the shaft in the motor.

2. Description of the Prior Art

A submersible pump is a centrifugal pump having a submersible motor that rotates the shaft to drive the pump. The motors for high volume oil and water production may be from six to sixty feet in length and be rated at several hundred horsepower. Each motor has a stator secured within a tubular housing. A rotor secured to a shaft rotates within the stator.

Because of the long length, the rotor is made up of a number of rotor sections. Each rotor section comprises a large number of flat disks called laminations that are secured by copper rods. The rotor sections are spaced-apart from each other, and a bearing assembly is located between each section for maintaining the shaft in axial alignment. The rotor sections are keyed to the shaft for rotation therewith, but are axially movable with respect to the shaft.

Each bearing assembly includes a sleeve keyed to the shaft for rotation therewith. A journal, commonly called a bearing, has a bore with a periphery that frictionally engages the inner wall of the stator at operating temperatures to prevent the bearing from rotating and to support the shaft in alignment.

As the motor heats up to operating temperature, the bearing will expand slightly outward to more tightly grip the stator. Also, the shaft will likely grow longitudinally, causing the bearing to move longitudinally with respect to the stator. The bearing must be precisely dimensioned so that it does not engage the stator wall so tightly as to create excessive thrust loads on thrust washers located above and below the bearing member. For accurate dimensioning, the bearing is normally constructed of a metal with an outer wall ground to a 0.005 inch tolerance. While satisfactory, this high tolerance makes the bearing expensive. Also, on occasion, the bearing begins to spin with the shaft, causing heat which is detrimental to the motor.

SUMMARY OF THE INVENTION

In this invention, a cavity is formed in the bearing. An elastomeric element is positioned in the cavity. The element is of a material that swells upon operation of the motor due to submersion in the motor oil. The element swells to frictionally engage the stator to prevent rotation of the bearing. In the preferred embodiment, the element is annular and protrudes no farther than the outer diameter of the bearing prior to filling the housing with oil. This facilitates insertion of the rotor in the assembly. Also, the elastomeric element preferably has an outer portion that is of lesser thickness than the cavity to allow a slight amount of longitudinal movement due to heat growth of the rotor with respect to the stator.

DESCRIPTION OF THE PREFERRED EMBODIMENT

Figure 1:
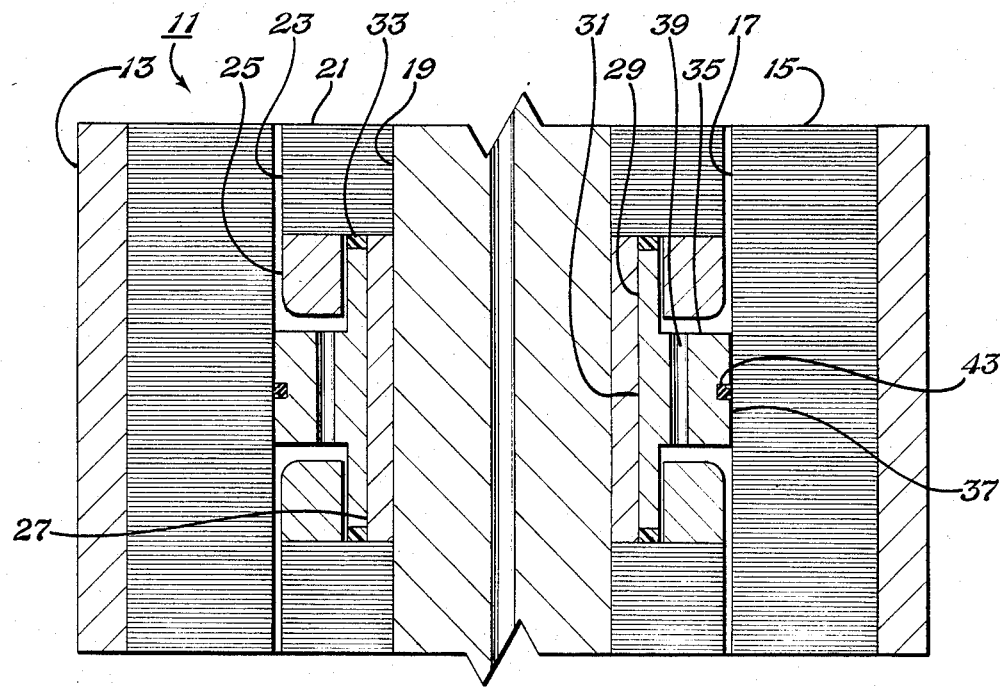
FIG. 1 is a partial cross-sectional view of a motor having a bearing assembly constructed in accordance with this invention.

Referring to FIG. 1, motor 11 includes a cylindrical housing 13. A stator 15 is rigidly mounted within housing 13. Stator 15 is made up of a large number of flat magnetic disks called laminations having slots through which wires (not shown) are wound in a conventional manner. Stator 15 has a cylindrical inner wall 17 that is of uniform constant diameter.

A rotor is rotatably mounted within the inner wall 17 of stator 15. The rotor comprises a shaft 19 and a large number of metallic disks or laminations. The laminations are divided into identical rotor sections 21 approximately 15 inches in length. A portion of two of the rotor sections 21 are shown. Each rotor section 21 has an outer wall 23 that is closely spaced to the inner wall 17 of stator 15. Each rotor section 21 is secured by copper rods (not shown), with copper end rings 25 on each end. The ends of the copper rods are brazed or mechanically welded to the end rings 25 to hold the laminations in each rotor section 21 together. Each rotor section 21 is secured by a key (not shown) to shaft 19 for rotation therewith. The rotor sections 21 are not individually axially locked to shaft 19. However, the lowermost rotor section 21 at the end of shaft 19 is axially locked to support the rotor sections with respect to shaft 19.

A bearing assembly is located between each of the rotor sections 21. The bearing assembly includes a sleeve 27 that is secured to shaft 19 for rotation therewith by means of a key (not shown). Sleeve 27 is preferably a bronze cylinder and is not axially locked to shaft 19. The upper edge or circular rim of sleeve 27 contacts the lowermost lamination of the upper rotor section 21. The lower edge of sleeve 27 contacts the uppermost lamination of the lower rotor section 21. Sleeve 27 supports the weight of the rotor sections 21 and transmits any force between one rotor section 21 to the other rotor section 21.

A journal or bearing 29 has a hub or inner portion 31 that is located within the inner bore of each end ring 25, with a clearance between the end ring 25 inner diameter and the hub 31 outer diameter. Hub 31 is cylindrical and has less length than sleeve 27.

A thrust washer 33 is located around the outer diameter of sleeve 27 and between the upper rotor section 21 and the upper edge of hub 31. A similar thrust washer 33 is located between the lower edge of hub 31 and the lower rotor section 21. Thrust washers 33 are preferably of a non-metallic material, such as a glass reinforced phenolic material. The distance from the lower side of the lower thrust washer 33 to the upperside of the upper thrust washer 33 is about 1/32 inch less than the height of sleeve 27. This prevents the thrust washers 33 from bearing the weight of the rotor sections 21 located above.

Bearing 29 has a flange or outer portion 35 that extends radially outward from hub 31. Outer portion 35 has a cylindrical periphery 37 that is spaced inward from inner wall 17 of stator 15 by a clearance of about 0.003 to 0.005 inch on the diameter. The longitudinal thickness or height of the outer portion 35 is less than the distance between two adjacent end rings 25. A plurality of passages 39 extend through the outer portion 35 for communicating oil contained within the housing 13. Bearing 29 is normally of a metallic material, preferably nitralloy.

Figure 2:
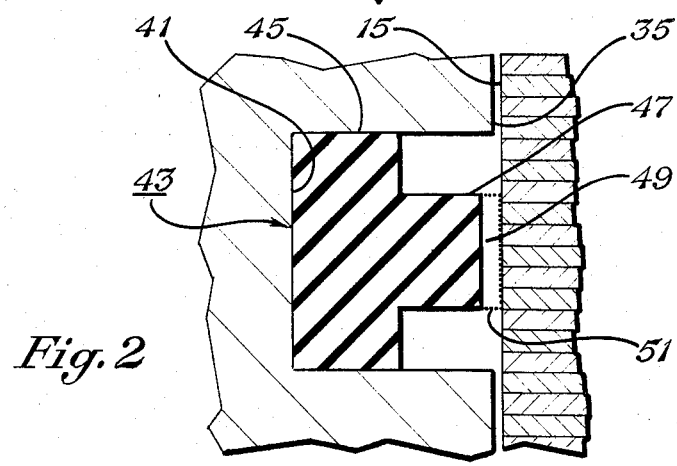
FIG. 2 is an enlarged sectional view of part of the bearing of FIG. 1.

Referring to FIG. 2, the periphery 37 of the bearing outer portion 35 has an annular groove or cavity 41 extending circumferentially around bearing 29 perpendicular to the axis of shaft 19. Cavity 41 is rectangular in cross-section. An elastomeric element or ring 43 is received within cavity 41. Ring 43 has a rectangular shaped inner portion 45, when viewed in cross-section. An outer portion 47 extends radially outward from the inner portion 45. The inner and outer portions 45 and 47 have about the same radial width. The outer portion 47 has a cylindrical periphery or outer diameter 49. The axial height or length of periphery 49 is less than the axial length of the inner portion 45, which is the same length as the cavity 41. The axial length of the outer portion 47 is roughly 60% the length of the inner portion 45.

Ring 43 is of an elastomeric material that will swell under prolonged contact with the type of oil that will be contained within the stator inner bore 17. Preferably ring 43 is an ethylene-propylene rubber. In the preferred embodiment, the material is more particularly an ethylene-propylene-diene monomer similar to that described in U.S. Pat. No. 3,926,900, Dec. 16, 1975, Guzy, et al., all of which material is hereby incorporated by reference. The preferred material differs from that shown in the patent in that the polybutadiene is decreased by about ½ with respect to the other components. This allows the ring 43 to swell considerably under prolonged contact with the motor oil and with the heat generated in the motor and in the well.

The ring 43 material and dimensions are selected such that prior to filling the housing 13 with motor oil, the outer periphery 49 will be slightly recessed within cavity 41. As a result, during installation of the rotor within the stator bore 17, ring 43 will not contact the stator inner wall 17, and the rotor can be smoothly inserted without drag. Once the motor begins operating, the oil and the temperature, within about ½ to 2 hours, will cause the ring 43 to swell such that the outer periphery will frictionally engage the stator inner wall 17 to prevent rotation of the bearing 29. The radial swelling is indicated by the dotted lines 51. In the preferred embodiment, the ring 43 has about a 2.8 inch outer diameter at outer wall 49 and a 2.4 inch inner diameter prior to filling with oil. Preferably the outer wall 49 will be recessed about 0.002 to 0.003 inch from the outer periphery 37 of bearing 29.

In operation, the rings 43 will be inserted into the cavities 41 and the sleeves 27 and bearings 29 will be assembled upon the shaft 19 between the rotor sections 21. The periphery 49 will be recessed within cavity 41 initially as shown in FIG. 2. Then the rotor is inserted into the stator 15. The housing 13 is filled with oil and the pump is lowered into the well. After startup, the oil and the heat will cause the ring 43 to expand so that its periphery 49 firmly engages the stator inner wall 17. The engagement of ring 43 prevents the bearing 29 from spinning with the shaft 19. The sleeve 27 will rotate within the hub 31. Heat will cause the rotor sections 21 to expand longitudinally. The reduced height of the outer portion 47 of ring 43 allows some flexing of the ring 43 to accommodate this expansion with respect to the stator inner wall 17. Once the motor has stopped running, the ring 43 may contract slightly, depending upon the type of material and the type of oil used.

The invention has significant advantages. The ring allows easy insertion of the rotor into the stator, yet stops the bearings from spinning once the motor begins operating. The ring is a simple and inexpensive addition to the bearing.

While the invention has been shown in only one of its forms, it should be apparent to those skilled in the art that it is not so limited but is susceptible to various changes without departing from the scope of the invention.

I claim:

1. In a submersible pump motor having an oil filled housing, a stator composed of magnetic laminations mounted in the housing, a rotor which includes a plurality of spaced-apart rotor sections mounted on a shaft carried within the stator, an improved bearing assembly mounted between adjacent rotor sections for supporting the shaft, comprising in combination:

a stationary bearing having a cavity in its outer periphery; and an element contained in the cavity, the element being of a material that swells due to influence of oil in the motor upon operation of the motor for frictionally engaging the stator to prevent rotation of the bearing.

2. In a submersible pump motor having an oil filled housing, a stator comprised of magnetic laminations mounted in the housing, a rotor which includes a plurality of spaced-apart rotor sections mounted on a shaft carried within the stator, an improved bearing assembly mounted between each of the rotor sections for supporting the shaft, comprising in combination:

a stationary bearing having an outer periphery spaced from the stator by a clearance and having an annular cavity; and an annular elastomeric element contained in the cavity, the element being of a material that will swell upon contact with oil of the motor for frictionally engaging the stator during operation of the motor to prevent rotation of the bearing.

3. In a submersible pump motor having an oil filled housing, a stator comprised of magnetic laminations mounted in the housing, a rotor which includes a plurality of spaced-apart rotor sections mounted on a shaft carried within the stator, an improved bearing assembly mounted between each of the rotor sections for supporting the shaft, comprising in combination:

a stationary bearing having an outer periphery containing an annular cavity; and an annular elastomeric element contained in the cavity for frictionally engaging the stator during operation of the motor to prevent rotation of the bearing, the element having an outer portion that extends radially outward from an inner portion and is of lesser vertical thickness than the inner portion.

4. In a submersible pump motor having an oil filled housing, a stator comprised of magnetic laminations mounted in the housing, a rotor which includes a plurality of spaced-apart rotor sections mounted on a shaft carried within the stator, an improved bearing assembly mounted between each of the rotor sections for supporting the shaft, comprising in combination:

a stationary bearing having an outer periphery that is less in diameter than the inner diameter of the stator and contains an annular cavity; and an annular elastomeric element contained in the cavity, the element being expansible, due to the influence oil of the motor and heat, from a recessed position in which its outer periphery has a diameter no greater than the outer diameter of the cavity to an expanded position during operation of the motor in which the outer periphery of the element contacts the stator to prevent rotation of the bearing.

5. In a submersible pump motor having an oil filled housing, a stator comprised of magnetic laminations mounted in the housing, a rotor which includes a plurality of spaced-apart rotor sections mounted on a shaft carried within the stator, an improved bearing assembly mounted between each of the rotor sections for supporting the shaft, comprising in combination:
- a stationary bearing having a cavity in its outer periphery; and
- an element contained in the cavity, the element being of an elastomeric material that swells upon contact with the oil in the housing;
- the element being expansible, due to the influence of oil of the motor and heat, from a recessed position in which its outer surface is recessed within the cavity to an expanded position during operation of the motor in which its outer surface contacts the stator to prevent rotation of the bearing.

* * * * *